UNITED STATES PATENT OFFICE.

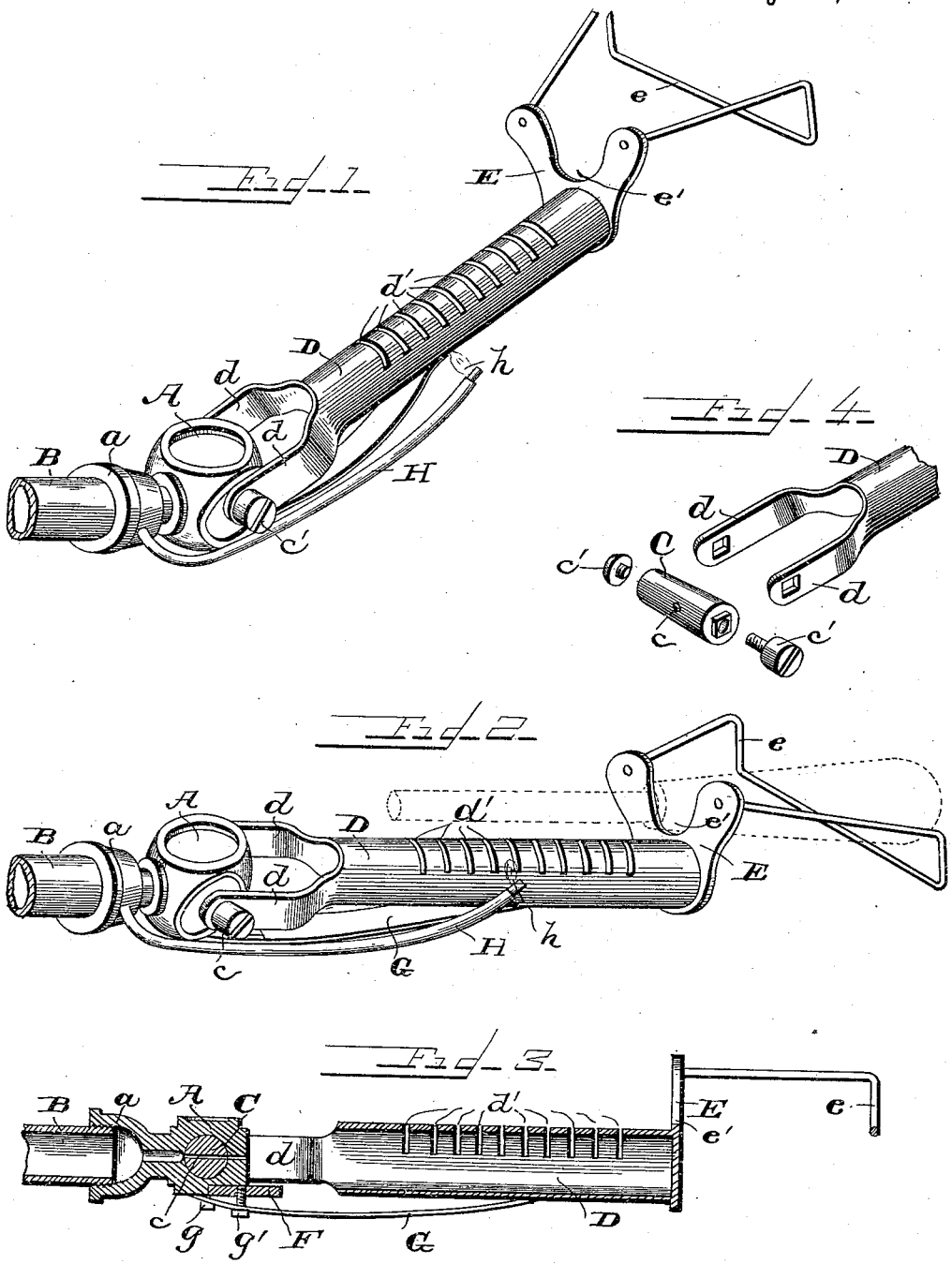

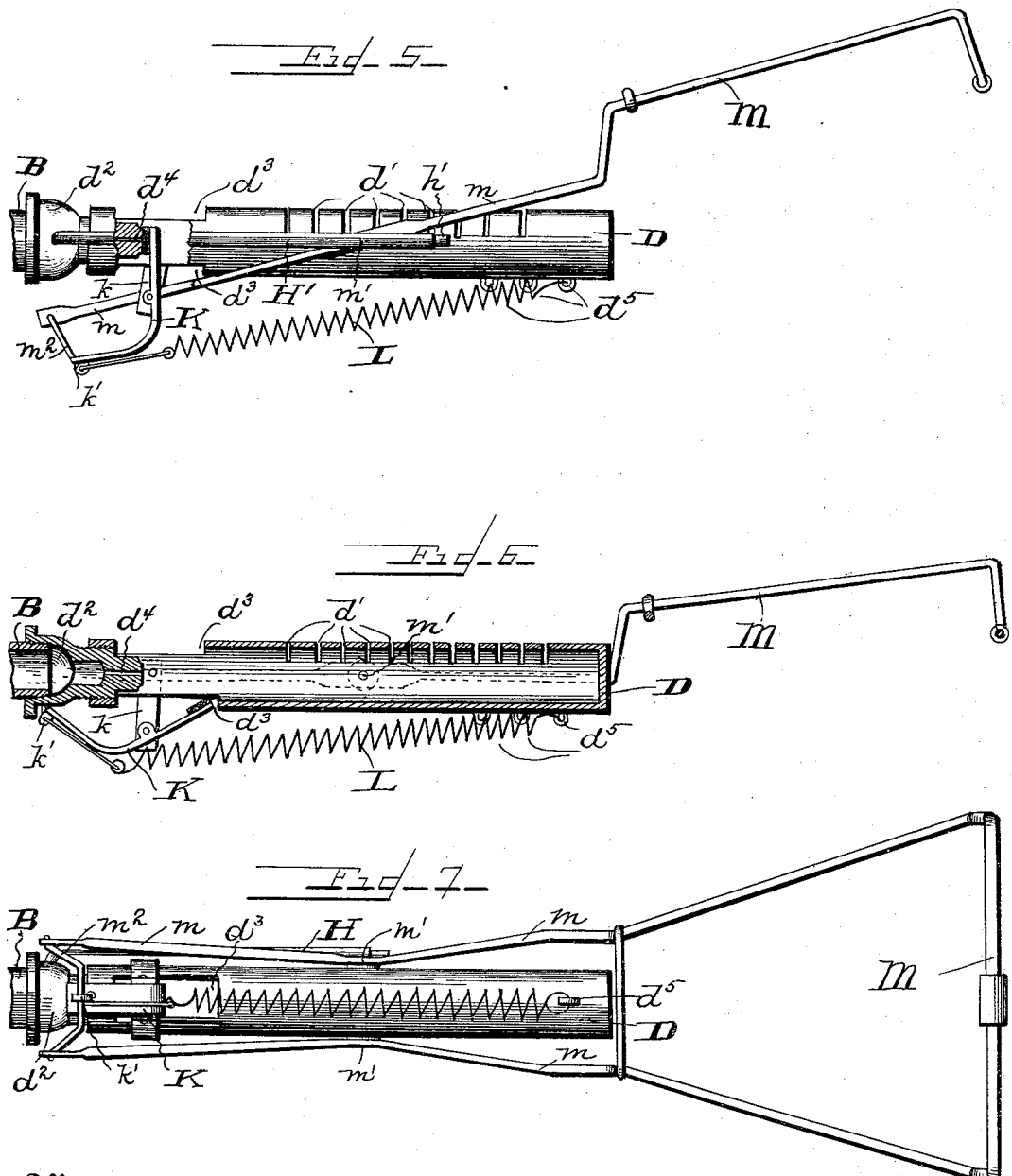

ANTON WEILER, OF AUBURN, NEW YORK, ASSIGNOR TO W. ALBERTINE L. WEILER, OF SAME PLACE, AND GERHARD WEILER, OF UTICA, NEW YORK.

TOOL-HEATER.

SPECIFICATION forming part of Letters Patent No. 479,686, dated July 26, 1892.

Application filed October 8, 1891. Serial No. 408,199. (No model.)

*To all whom it may concern:*

Be it known that I, ANTON WEILER, a citizen of the United States, residing at Auburn, in the county of Cayuga and State of New York, have invented certain new and useful Improvements in Tool-Heaters; and I do hereby declare the following to be a full, clear, and exact description of the invention, such as will enable others skilled in the art to which it appertains to make and use the same.

My invention is an improvement in tool-heaters; and it consists in the novel features of construction and combination of parts hereinafter fully described.

In the accompanying drawings I have illustrated two forms in which I have contemplated embodying my invention, and the same is fully disclosed in the following description and claims.

Referring to said drawings, Figure 1 is a perspective view of my improved tool-heater when not in use. Fig. 2 is a similar view of the device in position to heat a tool or other device, a tool being indicated in dotted lines. Fig. 3 is a longitudinal section of the device. Fig. 4 is a detail perspective of parts of the mechanism detached. Fig. 5 is a side view, partly in section, of a slightly-modified form of my invention. Fig. 6 is a sectional view of the same in position to heat a tool or other device, and Fig. 7 is a bottom view of the device.

In the form of my invention shown in Figs. 1, 2, and 3 A represents a valve or key seat provided with a screw-threaded collar $a$, by means of which it is secured to a gas-pipe B and supported thereby. The key-seat A is provided with a key or valve C, of usual or any preferred construction, which engages the key-seat and is capable of turning therein, said valve being provided with a suitable aperture $c$ for the passage of gas through the same when it is turned into the required position, as indicated in Fig. 3. The valve C is provided at one or both ends with polygonal portions, which are engaged by suitable apertures in arms $d\ d$, projecting from the burner D, so that a movement of the burner up or down will effect a movement of the valve in its seat. Suitable screws $c'$ secure the arms $d\ d$ to the valve. The burner D consists, in this instance, of a tube provided with semicircular slots $d'$ or slots extending part way round the circumference of said tube, which may be formed by sawing the tube partly through a series of five perforations, or jet-openings may be employed, if desired. I prefer, however, to employ a burner provided with a series of semicircular slots or recesses shown in the drawings. The burner D is provided with two rearwardly-extending arms $d\ d$, and the recessed portion between said arms will enable the gas discharged into the burner D, when the valve is open, to be thoroughly mixed with air, and thus produce a high degree of heat.

The outer end of burner D is provided with a rack or tool-holder. This rack preferably consists of the plate E, which closes the end of the tube or burner D and is suitably secured thereto, and the outwardly-extending portion $e$, which may be composed of wire or other suitable material and is supported from the plate E. I provide the plate E with a somewhat narrow opening or recess $e'$, just above the tube D, for the purpose of engaging the handle of the tool, if the tool to be heated has a handle, and preventing more than the part desired to be heated from coming in contact with the flame. When the tool is placed in engagement with the rack, the tool proper will be placed in the recess $e'$ of the plate E and moved toward the burner until the handle comes into contact with the plate, and the handle will thus be prevented from slipping over the flame and being charred or burned.

The inner side of the valve or key seat A is provided with a cross-bar F, upon the projecting ends of which the arms $d\ d$ of the burner rest when the device is in operative condition and a tool is on the rack with the part to be heated over the burner-orifices $d'$, thus forming stops to limit the downward movement of the burner on the valve or key as its pivot. When the burner is in this position, the valve or key is in a position to permit a flow of gas into the burner from pipe B, as clearly shown in Fig. 3.

When the tool is removed from the rack, the burner is raised into an inclined position by means of a retraction-spring G, which is secured to a rigid portion of the device, as the cross-bar F or key-seat A, and has its outer end engaging the under side of the burner-tube D. When the spring raises the burner D, after the removal of the tool, the valve C will thereby be turned, so as to cut off the supply of gas from the burner and prevent waste of gas when the device is not in use.

In order to enable my device to be used for heating tools of different weight, I prefer to provide means for adjusting the tension of the spring G, so that it may be regulated for light or heavy tools. In the drawings, Fig. 3, I have shown a spring secured in position by two screws $g$ $g'$. It will be seen that by turning the screw $g'$ the tension of the spring may be increased or diminished, as desired.

In order to provide convenient means for lighting the gas when the valve is opened by placing a tool on the tool-rack, I employ an auxiliary burner, which consists of a slender tube H, extending from a point in rear of the valve C to a point adjacent to the burner-orifices when the burner is depressed by the weight of a tool. The outer end of tube H is provided with a very small aperture, through which gas passes at all times and which burns in a tiny flame, as indicated at $h$, Fig. 1, adjacent to one end of one or more of the slots $d'$ of the burner. When the burner D is depressed by the weight of a tool, the valve C is opened and the gas from pipe B passes into the burner D mixed with air, where it passes out through the semicircular orifices $d'$ and is instantly ignited by the constantly-burning auxiliary flame at $h$. When the tool is removed, the retraction-spring G raises the burner D and closes the valve C, thus stopping the flow of gas and extinguishing the heating-flame, the auxiliary flame burning continually, as before stated.

In Figs. 5, 6, and 7 I have shown a slightly-modified construction, in which the burner proper remains stationary and the valve is controlled by the movement of the tool-holding rack, which in this construction is capable of movement independent of the burner. In these figures, B represents the gas-pipe to which the heater is attached, and D is the burner provided with the semicircular slots $d'$ or burner-orifices, as described in reference to Figs. 1, 2, 3, and 4, and having a screw-threaded collar $d^2$, by means of which it is secured to the pipe B. The burner D is provided with cut-away portions at $d^3$ $d^3$, as shown, to permit air to enter and mix with the gas before it reaches the burner-orifices, and the collar $d^2$ is provided with a small discharge-aperture $d^4$, which is adapted to discharge gas into the burner D. This discharge-aperture is provided with a valve K, which in this instance consists of a lever pivoted in suitable arms $k$, depending from the burner D or other stationary part and having a portion provided with asbestus, rubber, or other packing adapted to engage and close the aperture $d^4$. The lower end of the valve-lever K is provided with an aperture $k'$, and a retraction-spring L extends from this aperture or eye to a suitable point $d^5$ on the burner D, thus holding the valve normally over the aperture $d^4$ and closing the same. The tool-holding rack M is provided with the arms $m$ $m$, which are pivoted to the burner D at $m'$, and said arms extend rearwardly to a point adjacent to the valve-lever K and are connected to the same by a cross-bar or yoke $m^2$, as shown in the drawings, so that by depressing the tool-rack M the valve will be opened against the resistance of the retraction-spring L. By this construction the retraction-spring will operate upon the rack M as well as upon the valve, the parts being all connected for movement. In order to adjust the tension of the spring L, I provide the burner D with a series of lugs or projections $d^5$ at different distances from the valve, as shown in the drawings, so that the spring may be placed in engagement with any one, and the desired resistance of the spring can thus be obtained. The pipe B is provided with a lighting-tube H', which extends to a point adjacent to the burner-orifices and provides a continually-burning auxiliary flame at $h'$. The operation of this form of the device is substantially the same as the operation of the form first described.

When a tool is placed on the tool-rack M, the weight of the tool will overcome the resistance of the spring L and depress the rack. This will remove the valve from its position over the aperture $d^4$ and permit the gas to be forced into the burner, where it will be lighted instantly by the auxiliary flame at $h$. It will be seen that as the tool-rack is depressed the opposite ends of arms $m$ $m$ will rise until the yoke or cross-bar $m^2$ strikes the under side of the collar $d^2$, and thus forms a stop to limit the downward movement of the tool-rack.

My improved tool-heater will be found extremely convenient for heating tools of all kinds, as merely placing the tool on the rack turns on the flow of gas and lights the same, while the removal of the tool causes the flow of gas to cease, thereby preventing the waste which would ensue if the heating-flame burned all the time. The device is very small and compact, can be cheaply made, and quickly and easily attached to any gas pipe or burner.

It is obvious that slight variations may be made from the exact details of construction herein shown and described without departing from the spirit of my invention.

What I claim, and desire to secure by Letters Patent, is—

1. In a tool-heater, the combination, with the burner, of a valve controlling the admission of gas to the burner, means connected with said valve adapted to receive the weight of a tool for moving said valve in one direction, a spring for moving the valve in the opposite direction, and means for adjusting the tension of said spring, substantially as described.

2. In a tool-heater, the combination, with the key-seat having a discharge-opening and having a collar for attachment to a supporting-pipe and a key fitting said key-seat, of a burner connected with said key, a spring engaging said burner and holding said key in a position to close the discharge-aperture, a tool-rack secured to said burner, whereby the said burner may be depressed by the weight of a tool into line with the said discharge-opening, and an auxiliary tube extending to a point adjacent to the burner in its lower position for lighting the gas discharged into said burner, substantially as described.

3. In a tool-heater, the combination, with the key-seat having a discharge-passage, of the burner connected to said key and provided with a tool-rack, a spring engaging said burner and holding the key normally in a position to close said passage, whereby the burner may be depressed by the weight of a tool on said rack and made to operate said key to open the discharge-passage, an auxiliary tube extending to a point adjacent to the burner in its lower position, and stops for limiting the downward movement of the burner, substantially as described.

In testimony whereof I affix my signature in presence of two witnesses.

ANTON WEILER.

Witnesses:
CHAS. F. STUPP,
JAMES L. HICKOK.